United States Patent [19]
Dahmen et al.

[11] Patent Number: 5,873,908
[45] Date of Patent: *Feb. 23, 1999

[54] ALKOXY GROUP CONTAINING COPOLYMERS AND THEIR USE IN RETANNING LEATHER

[75] Inventors: Kurt Dahmen, Möchengladbach; Richard Mertens, Krefeld; Helmut Brehm, Krefeld; Horst Kilian, Krefeld; Jochen Houben, Tönisvorst; Thomas Müller, Düsseldorf, all of Germany

[73] Assignee: Stockhausen GmbH & Co. KG, Krefeld, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 735,987

[22] Filed: Oct. 25, 1996

Related U.S. Application Data

[62] Division of Ser. No. 387,948, filed as PCT/EP93/02197, Aug. 18, 1993, abandoned.

[30] Foreign Application Priority Data

Aug. 26, 1992 [DE] Germany .......................... 42 27 974.7

[51] Int. Cl.$^6$ ...................................... C14C 3/22
[52] U.S. Cl. ...................... 8/94.19 C; 8/94.19 R
[58] Field of Search ............................ 8/94.19 R, 94.33, 8/94.19 C

[56] References Cited

U.S. PATENT DOCUMENTS

| | | |
|---|---|---|
| 4,439,201 | 3/1984 | Lauton et al. . |
| 4,596,581 | 6/1986 | Hoehr et al. . |
| 4,631,063 | 12/1986 | Stockhausen et al. . |
| 4,737,549 | 4/1988 | Boemer et al. . |
| 4,743,666 | 5/1988 | Engelhardt et al. . |
| 4,800,220 | 1/1989 | Ribba .................................. 526/238.23 |
| 4,808,641 | 2/1989 | Yagi et al. . |
| 4,813,968 | 3/1989 | Kaussen et al. . |
| 4,980,437 | 12/1990 | Kaussen et al. . |
| 5,316,860 | 5/1994 | Stewart et al. ........................... 428/473 |
| 5,330,537 | 7/1994 | Stewart et al. . |

FOREIGN PATENT DOCUMENTS

| | | |
|---|---|---|
| 052730 | 6/1982 | European Pat. Off. . |
| 056627 | 7/1982 | European Pat. Off. . |
| 372746 | 6/1990 | European Pat. Off. . |
| 537870 | 4/1993 | European Pat. Off. . |
| 579267 | 1/1994 | European Pat. Off. . |
| 27 58 122 | 7/1979 | Germany . |

OTHER PUBLICATIONS

Hawley's Condensed Chemical Dictionary, 11th ed., 1987, p. 437; Van Nostrand Reinhold.
Abstract of Published German Patent Application No. DE 3,248,485.

*Primary Examiner*—Jeffrey Smith
*Assistant Examiner*—Wu C. Cheng
*Attorney, Agent, or Firm*—Evenson, McKeown, Edwards & Lenahan, P.L.L.C.

[57] ABSTRACT

The present invention relates to alkoxy-groups-containing copolymers of a) 1 to 99%-wt. water soluble ethylenically unsaturated, acid-groups-containing monomers, b) 1 to 50%-wt. monomers having a polyalkoxy sequence and c) 0 to 60%-wt. water soluble monomers which are copolymerizable with a) and b); and to the use of said copolymers for retanning leathers previously tanned by a mineral or combined method. The leathers treated with the retanning agents according to the invention in particular stand out for an improved fullness and good grain tightness.

The acid groups of monomers a) preferably are carboxyl groups.

12 Claims, No Drawings

ALKOXY GROUP CONTAINING COPOLYMERS AND THEIR USE IN RETANNING LEATHER

This application is a division of application Ser. No. 08/387,948 filed on Feb. 24, 1995, now abandoned.

The present invention relates to copolymers manufactured by polymerising a) 1 to 99%-wt., preferably 30 to 95%-wt., water soluble ethylenically unsaturated acid-groups-containing monomers, b) 1 to 50%-wt., preferably 5 to 35%-wt., monomers comprising a polyalkoxy sequence and c) 0 to 60%-wt., preferably 0 to 40%-wt., further water soluble monomers which are copolymerisable with a) and b). The invention further relates to the use of said copolymers for retanning leathers that have been tanned minerally or by a combined method and to agents comprising copolymers of the above type. Leathers treated with the retanning agents according to the present invention in particular stand out for an improved fullness and a good grain tightness.

The acid groups of the monomers a) are preferably carboxyl groups.

The use of acid-groups-containing polymers in the manufacture of leather corresponds to the state of the art. For instance, EP 29 906 B1 recommends to use water soluble carboxylic-groups-containing polymers to reduce the friction in wet processes in the manufacture of leather. The main advantage of said additives in the retanning is the fact that the tanning drums can be loaded to a greater extent without the risk of knots in the leather.

EP 61 420 B1 describes a process for retanning leather in which acrylic-based oligomers manufactured in the presence of sulfites or hydrogensulfites are used.

EP 84 134 B1 claims a retanning process which uses acrylic polymers having acid and amino groups, the ratio of said groups amounting to 20:1 to 20:17. The advantage of the leathers so treated is a deeper shade, as compared to untreated leathers.

Moreover, DE-OS 3 248 485 A1 describes a retanning process in which polymeric tanning agents are used which consist of at least 10% (meth)acrylic units neutralised with amines or amino alcohols and of 0 to 90% structural elements of acrylamide. The leather is distinguished by an improved grain tightness and deeper shade as well as softer handle. The disadvatange of said process is the expensive and costly preparation of the polymers by aminolysis of acrylic polymers.

Recently, further special copolymers for retanning have been described; for instance, the use of monomers having phosphonic acid and sulfonic acid esters (EP 113 438 B1); copolymers having at least 3 mole percent sulfonic-acid-groups-containing monomers (DE 3 413 301 C2); terpolymers consisting of 30 to 75% maleic acid (anhydride), 5 to 60% (meth)acrylic acid and 5 to 40% (meth)acrylonitrile (EP 216 089 B1); and finally the use of copolymers consisting of a) 90 to 20 mol-% (meth)acrylic acid and b) 10 to 80% of an aminoalkyl(meth)acrylamide wherein the amine nitrogen may be present in neutralised or quaternized form (EP 278 267 B1).

Although improved properties of the treated leathers are obtained by all these processes, there are no quantified indications with respect to filling properties of the polymers. In addition, the use of polymers having alkoxy sequences is not mentioned in any of said patents.

Finally, EP 372 746 A2 describes the treatment of leather using amphiphilic copolymers mainly consisting of hydrophobic monomers and a smaller amount of hydrophilic monomers for the simultaneous retanning and fat-liquoring of leather. Although the use of ethoxylated monomers as hydrophobic units is proposed in the description, no considerable increase in fullness is obtained by the use of these polymers.

Thus it is the object of the present invention to provide retanning agents which are capable of improving even low-quality leathers with respect to fullness and grain tightness.

Surprisingly, this object has been achieved by treating leathers which were previously tanned by a mineral or combined method with copolymers manufactured by polymerisation of a) 1 to 99%, preferably 30 to 95%, by weight water soluble ethylenically unsaturated acid-groups-comprising monomers and/or unsaturated dicarboxylic acid anhydrides, b) 1 to 50%, preferably 5 to 35%, by weight of an ethylenically unsaturated multiply alcoxylated monomer of the general formula (1):

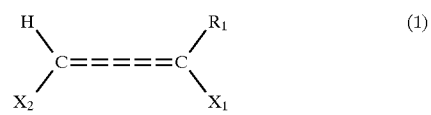

with
$R_1$=H or methyl
$X_1$=COOR$_2$, CH$_2$OR$_2$, CH$_2$N(R$_2$)$_2$, OR$_2$
$X_2$=H, COOH, CONHR$_3$, CH$_2$OR$_2$
and
$R_2$=[—CHR$_4$—CHR$_5$—O]$_n$—CHR$_4$—CHR$_5$—Y—R$_6$
$R_3$=H or $C_{1-C4}$ alkyl
$R_4$,$R_5$=H or methyl
n=1 to 50
Y=O, NR$_7$, S
$R_6$=H, $C_1$–$C_{24}$ alkyl, $C_6$–$C_{12}$ aryl, $C_7$–$C_{24}$ alkylaryl, $C_2$–$C_{24}$ saturated monocarboxylic or dicarboxylic acid residue
$R_7$=$C_{1-C4}$ alkyl,
and c) 0 to 60%, preferably 0 to 40%, by weight further water soluble monomers which are copolymerisable with a) and b), with the proviso that the weight percentage of a), b) and c) make up 100%.

The preferred acid group of the monomers a) is the carboxyl group. Another acid group may be the sulfonic group.

The formed acid-groups-comprising polymer is used in partially or completely neutralised form as aqueous solution or emulsion.

Compared to the use of conventional polymeric retanning agents manufactured according to the above state of the art, improved properties of the leathers with respect to fullness, softness and grain tightness are surprisingly obtained by using the copolymers according to the invention.

The copolymers are manufactured according to usual processes by radical mass, solution or emulsion polymerisation of the monomers from groups a), b) and c) at temperatures of 20° to 200° C.

Suitable monomers of group a) are polymerisable water soluble acid-groups-containing monomers, such as, for example, ethylenically unsaturated monocarboxylic acids, the anhydrides thereof and the salts thereof; sulfonic acids and unsaturated dicarboxylic acids, the anhydrides thereof as well as the semiesters or semiamides thereof.

Examples for this group include: (meth)acrylic acid, (meth)allyl sulfonic acid, 2-acrylamido-2-methylpropane sulfonic acid, vinylsulfonic acid, styrene sulfonic acid, maleic acid, maleic anhydride, fumaric acid, fumaric acid anhydride, itaconic acid as well as semiesters and semiamides of maleic acid, fumaric acid and itaconic acid, the latter monomers being obtainable by reaction of the corresponding anhydrides with alcohols, amines or amino alcohols.

Among said monomers acrylic acid, methacrylic acid as well as maleic acid and maleic anhydride, respectively, are preferred.

The monomers of group b) are obtained either by alkoxylation of ethylenically unsaturated compounds having at least one hydroxy or amino group and optional reaction with saturated acid derivatives, or by the reaction of the alkoxy adducts of saturated aliphatic, cycloaliphatic, aromatic alcohols, amines or thiols with ethylenically unsaturated carboxylic acids, reactive carboxylic acid derivatives or allyl halides.

A further method of manufacturing the monomers of group b) according to the invention is the addition of the mentioned alkoxy products to acetylene to form the corresponding vinyl ethers.

Examples for the first monomer class include: ethylene- and/or propylene-oxiadducts of (meth)-allyl alcohol, 1,4-butenediol, (meth)allyl amine and hydroxyethyl(meth) acrylate, optionally further reacted with reactive saturated acid derivatives.

Examples for the second class include the reaction products of ethylene glycol, isopropyl glycol, butyl glycol, butyl diglycol, and nonylphenol, isotridecanol, which are preferably capped at one end, with ethylene or propylene oxide and further reaction of the alkylene-oxiadducts with (meth) acrylic acid, allyl chloride, or other reactive unsaturated acid derivatives, such as the acid anhydrides, acid halides or acid esters.

Among these adducts allyl alcohols having 5 to 30 ethylene-oxide-units (EO-units) and nonylphenol polyglycol(meth)acrylates having 5 to 30 EO-units are preferably used to prepare the polymers according to the present invention.

The techniques to manufacture said monomers are known to those skilled in the art (cf. for instance, Ullmanns Encyklopadie der Technischen Chemie, 4th edition 1980, volume 7, page 45; vol. 19, pages 31–38; vol. 22, page 489ff.).

Any water soluble monomers which are copolymerisable with a) and b) can be used as monomers of group c), e.g., ethylenically unsaturated amides, nitriles and/or esters. Typical representatives of this class are (meth)acrylamide, dimethylaminopropyl (meth) acrylamide, (meth) acrylonitrile, (meth)-acrylic methylester, hydroxyethyl (meth)acrylate, vinyl acetate and N-vinyl pyrrolidone.

The production of the polymers according to the invention can be carried out by bulk polymerisation or in the presence of a solvent. For this purpose, those solvents are suitable which perform a satisfactory solvation of both monomer classes, in particular water and $C_1$ to $C_8$ alcohols or alkoxy alcohols, respectively.

The reaction can be started by redox catalysis, thermal or photochemical initiation by means of known initiator systems, peroxo compounds and/or azo compounds which are soluble in the monomer mixture being particularly suitable.

The number average molar mass of the obtained polymers is in the order of 500 to 50,000 g/mol, whereby the molar mass can be controlled by the amount of initiator, the monomer concentration or the choice of the polymerisation temperature or the use of regulators known per se, such as mercaptans.

In order to obtain finely divided stable emulsions, in particular if monomers of group b) having more than 10 added alkylene oxide units are used, it may be useful to add an amount of 0.5 to 5%-wt., relative to the monomer mixture, of an anionic or non-ionic surfactant to the reaction mixture or after termination of the polymerisation.

The monomers of group b) may also be prepared during polymerisation, for instance by known reactions of unsaturated acid derivatives with the corresponding alkoxylation products of alcohols, amines or thiols. It is also possible—after the polymerisation has taken place—to bind the alkoxylation adducts of alcohols, amines or thiols to the polymer body by reaction with reactive acid derivatives bound to the polymer.

After termination of the reaction, the polymers are partially neutralised by the addition of bases and, optionally, water and brought into the form of an aqueous solution or dispersion. The amount of base is chosen such that the pH-value of the resultant solution or dispersion adjusts to between 5 and 9. Suitable neutralising agents are alkali hydroxides, alkaline-earth metal hydroxides, ammonia, amines, polyamines or amino alcohols.

The aqueous solutions or dispersions according to the invention have an active substance content of 10 to 70%, preferably 20 to 60%, by weight.

The treatment of the tanned hides with the copolymers according to the invention is carried out in aqueous liquor obtainable by diluting or dispersing the mentioned products with water. The required quantity of the copolymer solid can amount to 0.02 to 10%-wt., relative to the shaved weight of the leather. It is preferred to use quantities of 0.1 to 7.5% by weight; 0.4 to 5%-wt. being sufficient to obtain good leather properties in most cases. The length of liquor amounts to 50 to 1,000%-wt., preferably 100 to 500% by weight. The treatment is carried out at a pH value of the liquor of 3.5 to 6 and at a temperature of 20° to 60° C. within a period of 5 to 180 minutes, preferably 20 to 60 minutes. For instance, it may be effected by milling in a drum. The treatment may be carried out using the products of the invention alone or in combination with known fat liquors and greases and/or dyeing agents.

The present invention will be further illustrated by the following embodiment examples.

Preparation of the copolymers

EXAMPLE 1

510.6 g deionized water, 0.21 g sodium disulfite and 7.5 g of a fatty alcohol ether sulfate are placed in a three-neck flask equipped with blade agitator and reflux condenser and heated to 80° C. On reaching the temperature, a mixture of 69.8 g methacrylic acid, 6 g nonylphenoxy(14-EO) methacrylate and 15 g of the fatty alcohol ether sulfate and a solution of 0.21 g ammonium peroxodisulfate in 75 g water are simultaneously added dropwise through different feed inlets within two hours. After completion of the addition, stirring is continued for 1 hour and, finally, neutralisation is effected with 66.4 g 45% sodium hydroxide solution at 50° C. A flowable viscous dispersion having 15.3% active substance is obtained.

Viscosity (Brookfield RVM, Sp. 3, 2.5 rpm): 19,600 mPas pH value (1: 10): 8.2

EXAMPLE 2

325 g deionized water, 138 g acrylic acid, 10 g dodecyl benzene sulfonic acid, 12 g nonylphenoxy(14-EO) methacrylate, 0.2 g mercaptoethanol and 1 g of a 0.6% solution of iron(II) sulfate are placed in a three-necked glass flask fitted with stirrer and cooler. Polymerisation is started at 20° C. by simultaneously adding a solution of 3.6 g sodium persulfate in 10 g water and 1.8 g sodium bisulfite in 10 g water. A maximum temperature of 99° C. is reached within five minutes. Reaction is continued at 80° C. for two hours. After 30 and 90 minutes, 1.8 g and 1 g, respectively, of the peroxo compound in 7 g water are added for after-catalysis. After a total reaction time of 2 hours, 27.3 g butyl diglycol are added, and the mixture is neutralised by the addition of 104.3 g of a 25% ammonia solution. A finely divided flowable emulsion having 30% active substance is obtained which can be diluted with water at will.

Viscosity (Brookfield RVM, Sp. 6, 10 rpm): 19,000 mPas
pH value (1:10); 6.4

EXAMPLE 3

The same procedure as in Example 2 is carried out, with the difference that 20 g isotridecyl (20-EO) methacrylate is used as monomer of group b).

Viscosity (Brookfield RVM, Sp. 5, 5 rpm): 13,000 mPas
pH (1:10): 5.2

EXAMPLE 4

74.2 g of a reaction product of 240 g allyl alcohol (10 EO) and 50 g succinic acid anhydride, and 1025 g deionized water are placed in a reactor equipped with blade agitator and reflux condenser and heated to 80° C. under nitrogen purging. Through different feed inlets, 303.8 g acrylic acid, 100 g of a 20% aqueous sodium persulfate solution, and 100 g of a 10% aqueous sodium bisulfite solution are simultaneously and evenly added dropwise within a period of 1 hour. After another hour of reaction time at 80° C., neutralisation is carried out with 382 g 45% sodium hydroxide solution. A clear low-viscosity solution having 25% active substance is obtained.

Viscosity (Brookfield RVM Sp. 1, 10 rpm): 100 mPas
pH-value (1:10); 7.3

EXAMPLE 5

130.2 g allyl alcohol (5 EO) and 1025 g deionized water are placed in a reactor equipped with blade agitator and reflux condenser and heated to 80° C. under nitrogen purging. 303.8 g acrylic acid, 100 g of a 20% aqueous sodium persulfate solution, and 100 g of a 10% aqueous sodium bisulfite solution are simultaneously and evenly metered through different feed inlets within 1 hour. After another hour of reaction time at 80° C., neutralisation is effected with 382 g 45% sodium hydroxide solution. An opal low-viscosity solution having 30% active substance is obtained.

Viscosity (Brookfield RVM, Sp. 1, 10 rpm): 190 mPas
pH-value (1:10); 7.6

EXAMPLE 12

42.8 g allyl alcohol (10 EO+10 PO) and 291.2 g deionized water are placed in the equipment of Example 5 and heated to 80° C. under nitrogen purging. At the same time, through different feed inlets, 100.0 g acrylic acid, 33.0 g of a 20% aqueous sodium persulfate solution and 33.0 g of a 10% aqueous sodium bisulfite solution are evenly metered within 1 hour. After a further hour of reaction at 80° C., it is neutralised with 111.0 g 50% sodium hydroxide solution. An opal low-viscosity solution having 31 % active subtance is obtained.

Viscosity (Brookfield RVM, Sp. 1, 10 rpm): 660 mPas
pH-value (1:10): 8.0

EXAMPLE 13

The same procedure as in Example 2 is used, with the difference that the monomer preparation consists of 96.6 g acrylic acid, 13.8 g acrylamide and 12.0 g nonylphenoxy (14EO)methacrylate.

Viscosity (Brookfield RVM, Sp. 6, 10 rpm): 26,000 mPas
pH-value (1:10): 6.0

EXAMPLE 14

The same procedure as in Example 2 is used, with the difference that the monomer preparation consists of 96.6 g acrylic acid, 41.5 g acrylamide and 12.0 g nonylphenoxy (14EO)methacrylate.

Viscosity (Brookfield RVM, Sp. 6, 10 rpm): 15,000 mPas
pH-value (1:10): 6.2

EXAMPLE 15

The same procedure as in Example 2 is used, with the difference that the monomer preparation consists of 138.0 g acrylic acid and 27.1 g of a methoxypolyethylene glycol methacrylate having approx. 45 added ethylene oxide units.

Viscosity (Brookfield RVM, Sp. 3, 10 rpm): 3,800 mPas
pH-value (1:10): 6.6

EXAMPLE 16

The same procedure as in Example 2 is used, with the difference that the monomer preparation consists of 138.0 g acrylic acid and 8.0 g of a isopropoxypolyethylene glycol acrylate having approx. 11 added ethylene oxide units.

Viscosity (Brookfield RVM, Sp. 3, 10 rpm): 2,050 mPas
pH-value (1:10): 6.6

EXAMPLE 17

The same procedure as in Example 2 is used, with the difference that the monomer preparation consists of 138.0 g acrylic acid and 12.0 g of a vinyl ether of methanol having approx. 7 added ethylene oxide units.

Viscosity (Brookfield RVM, Sp. 3, 5 rpm): 11,500 mPas
pH-value (1:10): 6.4

EXAMPLE 18

The same procedure as in Example 2 is used, with the difference that the monomer preparation consists of 125.0 g acrylic acid and 25.0 g of a vinyl ether of methanol having approx. 12 added ethylene oxide units.

Viscosity (Brookfield RVM, Sp. 6, 10 rpm): 30,000 mPas
pH-value (1:10): 6.3

EXAMPLE 19

130 g butenediol-1,4 having 30 moles EO and 30 moles PO and 540 g deionized water are placed in the equipment of Example 5 and heated to 95° C. under nitrogen purging. Through different feed inlets 303.8 g acrylic acid, 100.0 g of a 20% aqueous sodium persulfate solution and 100.0 g of a 10% aqueous sodium bisulfite solution are evenly added dropwise at the same time within 1 hour. After a further hour of reaction at 95° C., neutralisation is effected with 344.0 g 50% sodium hydroxide solution. An opal low-viscosity solution having 37% active subtance is obtained.

Viscosity (Brookfield RVM, Sp. 1, 1 rpm): 4,000 mPas
pH-value (1:10): 7.5

EXAMPLES 6–11 and 20–27

Application in Leather Technology

The treatment of the leathers with the copolymers according to the invention and with the comparative sample Magnopal 5067 (Chem. Fabrik Stockhausen GmbH, FRG) was conducted according to the following procedure:

Leather: cattle hides, type: upper leather, wet blue, shaved substance 1.8 to 2.0 mm, %-indications relative to the shaved weight.
1) Washing     300% water                              35° C.
               0.5% formic acid 1:5
               0.5% degreasing agent[(1)]              15 min.
Drain off bath
2) Neutralisation  100% water                          35° C.
                   2% sodium formate
   Retanning       2% retanning agent[(2)]             45 to
                                                       60 min.
Final pH of bath: 4.3 to 5.1
Leather cross-section against Bromocresol green: green-blue
Drain off bath
3) Washing      300% water                             60° C.
                                                       10 min.
Drain off bath
4) Retanning    100% water                             60° C.
                4 to 10% polymer tanning               30 min.
                agent acc. to Examples 1–5
                and 12–19, 1:4
5) Dyeing       1% Baygenal Braun L-NR[(3)], 1:20  2 × 10 min.
6) Fat-liquoring 8–12% anionic fat-liquor              30 min
                combination, 1:4                       30 min.
                + 1% formic acid 1:5
Final pH of bath: 3.5 to 3.9
Drain off bath
7) Rinsing      water 20° C.                           5 min.
Leather: horse up overnight, milling, vacuum drying (80° C., 3 min.), drying in suspended condition, moisten, staking, ironing.

[(1)]Non-ionic surfactant combination, manufacturer: Chemische Fabrik Stockhausen GmbH, tradename: Tetralix SMS
[(2)]Light-fast, anionic retanning agent having a strong neutralising and buffering effect, manufacturer: Bayer AG, tradename TANIGAN PC
[(3)]Product from Bayer AG, Leverkusen The leathers obtained were tested by measuring the thickness in mm and by grading the softness, grain tightness and color of the leather. The results of the leather technological application of the polymers of the Examples according to the invention are shown in the following table. A commercial retanning agent based on acrylic acidlacrylamide, tradename Magnopal 5067 (Chem. Fabrik Stockhausen GmbH) was used for comparison purposes.

| Example | Polymer acc. to Ex. | Thickness (mm) | Softness | Grain tightness | Leather color |
|---|---|---|---|---|---|
| 6  | 1  | 2.1/2.2 | 1–2 | 1–2 | medium |
| 7  | 2  | 2.2/2.4 | 4   | 2–3 | light |
| 9  | 4  | 2.0/2.1 | 1   | 2   | medium |
| 10 | 5  | 2.0/2.2 | 3–4 | 2   | dark |
| 20 | 12 | 1.9/2.0 | 4   | 4   | medium |
| 21 | 13 | 2.1/2.2 | 3   | 2   | medium |
| 22 | 14 | 1.8/2.0 | 3   | 3   | light |
| 23 | 15 | 2.0/2.1 | 2–3 | 3   | dark |
| 24 | 16 | 2.0     | 3–4 | 3   | medium |
| 25 | 17 | 1.8/1.9 | 4   | 2   | light |
| 26 | 18 | 1.8/1.9 | 2–3 | 2   | medium |
| 27 | 19 | 1.9/2.0 | 2–3 | 3–  | light |
| 11 | Comparison | 1.7/1.8 | 3–4 | 2 | very dark |

In addition to improving the other leather properties, all of the example polymers according to the present invention in the first line gave a considerable increase in fullness, compared to the result when using a polymer according to the state of the art.

We claim:

1. A process for retanning leather which has been tanned by a mineral or a combined method, said process comprising treating the leather in aqueous phase at a bath length of 50 to 1,000% by weight, a bath pH of from 3.5 to 6, and temperatures of 20° to 60° C., for a period of from 5 to 180 minutes, with 0.02 to 10% by weight, relative to shaved weight of the leather, of a polymer produced by polymerization of:

a) 1 to 99% by weight of at least one water-soluble, ethylenically unsaturated, acid-group-containing monomer and/or unsaturated di-carboxylic acid anhydride, b) 1–50% by weight of at least one ethylenically unsaturated, alcoxylated monomer corresponding to Formula (1):

wherein
   $R_1$=H or methyl;
   $X_1$=COO$R_2$, CH$_2$O$R_2$, CH$_2$N (R$_2$)$_2$, or O$R_2$;
   $X_2$=H, COOH, CONH$R_3$, CH$_2$OR$_2$;
   $R_2$=[—CH$R_4$—CH$R_5$—O—]$_n$—CH$R_4$—CH$R_5$—Y—$R_6$;
   $R_3$=H or $C_1$–$C_4$ alkyl;
   $R_4$=H or methyl;
   $R_5$=H or methyl;
   n=1 to 50;
   Y=O, N$R_7$, or S;
   $R_6$=H, $C_1$–$C_{24}$ alkyl, $C_6$–$C_{12}$ aryl, $C_7$–$C_{24}$ alkylaryl, or $C_2$–$C_{24}$ saturated mono-carboxylic or di-carboxylic acid residue;
   $R_7$=$C_1$–$C_4$ alkyl;

and c) 0 to 60% by weight of at least one further water-soluble monomer which is copolymerizable with a) and b); and
   wherein the weight percentages of a), b) and c) total 100%.

2. A process according to claim 1, wherein the leather is treated with 0.1 to 7.5% by weight of said polymer.

3. A process according to claim 2, wherein the leather is treated with 0.4 to 5% by weight of said polymer.

4. A process according to claim 1, wherein the leather is treated at a bath length of 100 to 500% by weight.

5. A process according to claim 1, wherein the leather is treated for a period of from 20 to 60 minutes.

6. A process according to claim 1, wherein said polymer comprises from 30 to 95% by weight of said water-soluble, ethylenically unsaturated, acid-group-containing monomer and/or unsaturated di-carboxylic acid anhydride.

7. A process according to claim 1, wherein said polymer comprises 5 to 35% by weight of said ethylenically unsaturated, alcoxylated monomer of Formula (1).

8. A process according to claim 1, wherein said polymer comprises from 0 to 40% by weight of said further water-soluble monomers which are copolymerizable with a) and b).

9. A process according to claim 9, wherein said ethylenically unsaturated monomer of Formula (1) is polyalcoxylated.

10. A process according to claim 1, wherein said ethylenically unsaturated monomer of Formula (1) is monoalcoxylated.

11. A process according to claim 1, wherein monomers a) b) and c) are monounsaturated, and said polymer is a linear polymer.

12. A retanned leather produced by the process of claim 1.

* * * * *